United States Patent
Biffle et al.

(10) Patent No.: US 10,125,689 B2
(45) Date of Patent: Nov. 13, 2018

(54) DIFFUSER REMOVAL TOOL

(71) Applicant: General Electric Company, Schenectady, NY (US)

(72) Inventors: Stephen Matthew Biffle, League City, TX (US); Donald Gordon Laing, Clear Lake, TX (US); Jorge Mario Rochin Machado, Corregidora (MX); Ramune Auzelyte, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 184 days.

(21) Appl. No.: 15/348,446

(22) Filed: Nov. 10, 2016

(65) Prior Publication Data

US 2018/0128181 A1    May 10, 2018

(51) Int. Cl.
*F02C 7/24* (2006.01)
*F02C 3/04* (2006.01)

(52) U.S. Cl.
CPC ............... *F02C 7/24* (2013.01); *F02C 3/04* (2013.01); *F05D 2230/70* (2013.01); *F05D 2260/96* (2013.01)

(58) Field of Classification Search
CPC . F04D 29/44; F04D 1/14; F04D 7/065; F04D 29/445; F01D 25/285; Y10T 29/49824; Y10T 29/53991
USPC .......................... 29/426.6, 259, 265, 278, 283
See application file for complete search history.

(56) References Cited

U.S. PATENT DOCUMENTS

| | | | | |
|---|---|---|---|---|
| 4,007,535 A | * | 2/1977 | Brandt | B25B 27/023 29/261 |
| 4,031,603 A | * | 6/1977 | Shultz | B25B 27/304 29/259 |
| 4,068,365 A | * | 1/1978 | Brandt | B25B 27/023 29/261 |
| 5,174,005 A | * | 12/1992 | Somerville | B25B 27/023 29/261 |
| 5,224,254 A | * | 7/1993 | McPeak | B25B 27/023 29/261 |
| 5,419,027 A | * | 5/1995 | McPeak | B25B 27/023 29/252 |
| 5,557,833 A | * | 9/1996 | Pool | B25B 27/023 29/261 |
| 6,601,278 B2 | * | 8/2003 | Koppe | B25B 27/023 29/256 |

(Continued)

*Primary Examiner* — Mark Laurenzi
*Assistant Examiner* — Shafiq Mian
(74) *Attorney, Agent, or Firm* — Fletcher Yoder, P.C.

(57) ABSTRACT

A diffuser removal tool for displacing an exhaust diffuser from a gas turbine engine is provided, which includes a pair of support arms, a clamp and wedge assembly coupled to an exhaust diffuser, and a lead screw assembly coupled between the support arms and to the clamp and wedge assembly via a wedge of the clamp and wedge assembly. The tool also includes a pair of linear bearing assemblies coupled to the support arms and to the clamp and wedge assembly via wedges of the clamp and wedge assembly. The lead screw assembly is configured to displace the diffuser in an axial direction relative to a longitudinal axis of the gas turbine engine while the linear bearing assemblies are configured to both enable the displacement of the diffuser in the axial direction while vertically supporting the diffuser to maintain alignment between the diffuser and the gas turbine engine.

20 Claims, 10 Drawing Sheets

(56) References Cited

U.S. PATENT DOCUMENTS

| | | | |
|---|---|---|---|
| 6,665,918 B1* | 12/2003 | Williams | B25B 27/023 |
| | | | 29/252 |
| 8,075,690 B2 | 12/2011 | Keller et al. | |
| 8,702,081 B2* | 4/2014 | Melchior | B25B 5/10 |
| | | | 269/107 |
| 9,757,849 B2* | 9/2017 | Stepp | B25B 27/023 |
| 9,802,301 B2* | 10/2017 | Caston | B25B 27/02 |
| 9,802,302 B1* | 10/2017 | Colson | B25B 27/062 |
| 9,908,225 B2* | 3/2018 | Trevino Cotilla | B25B 27/20 |
| 2009/0139071 A1* | 6/2009 | Palka | B25B 27/02 |
| | | | 29/259 |
| 2009/0278021 A1 | 11/2009 | Jimeno De La Torre | |
| 2010/0101065 A1* | 4/2010 | Macchia | F01D 25/285 |
| | | | 29/259 |
| 2013/0206098 A1 | 8/2013 | Betts, Sr. | |
| 2013/0276285 A1* | 10/2013 | Macchia | F01D 25/285 |
| | | | 29/426.5 |
| 2014/0338165 A1* | 11/2014 | Edwards | B23P 19/10 |
| | | | 29/252 |
| 2016/0102567 A1* | 4/2016 | Mihalic | F01D 9/04 |
| | | | 60/805 |

* cited by examiner

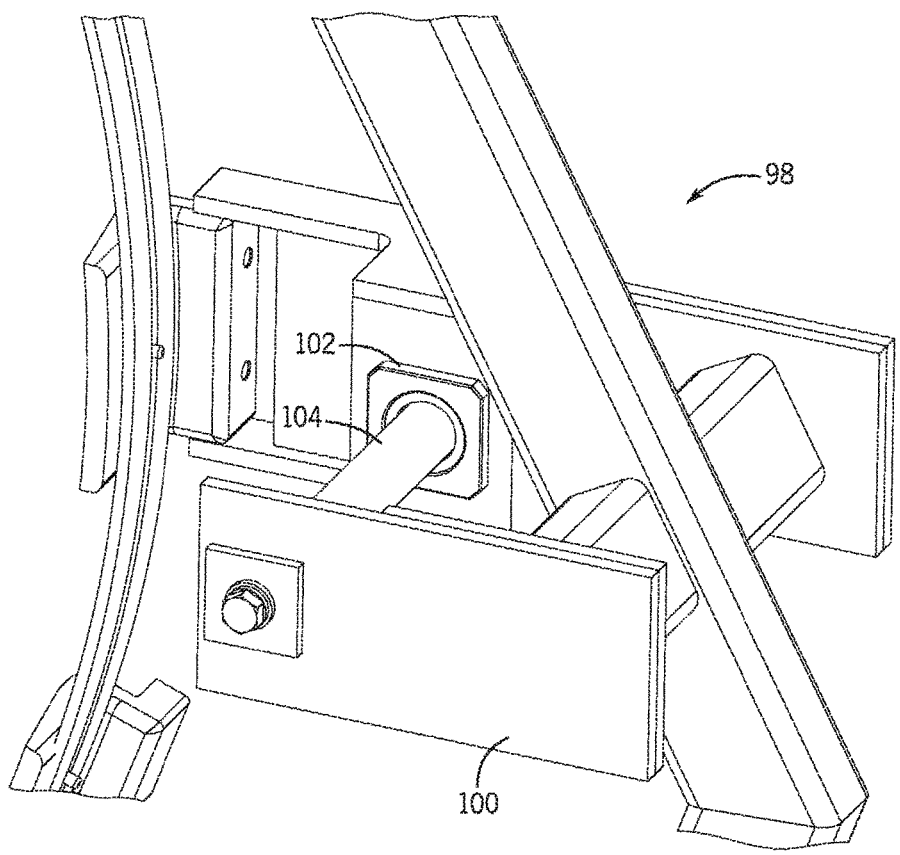
FIG. 10

DIFFUSER REMOVAL TOOL

BACKGROUND

The subject matter disclosed herein relates to exhaust diffusers for a gas turbine, more specifically, a tool for removing an exhaust diffuser.

Gas turbine systems generally include a gas turbine engine having a compressor section, a combustor section, and a turbine section. The turbine section generally receives hot combustion gases, and outputs exhaust and usable rotational energy. An exhaust diffuser is usually coupled to the turbine to receive exhaust from the turbine. The exhaust diffuser is also coupled to an exhaust collector where at least some of the exhaust from the diffuser is output. For maintenance activities such as gas turbine removal and drive train alignment, the exhaust diffuser may have to be disconnected from the turbine rear frame. This may be a difficult and cumbersome undertaking.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a system includes a gas turbine engine including a compressor, a combustor section, a turbine, and an exhaust diffuser. The system also includes an exhaust collector coupled to the exhaust diffuser, wherein the exhaust diffuser is partially disposed within the exhaust collector. The system further includes a diffuser removal tool configured to couple to both the exhaust collector and the exhaust diffuser and to separate the exhaust diffuser from the gas turbine by displacing the exhaust diffuser further into the exhaust collector in an axial direction relative to a longitudinal axis of the gas turbine engine while vertically supporting the exhaust diffuser to maintain axial alignment between the exhaust diffuser and the gas turbine engine.

In another embodiment, a diffuser removal tool for displacing an exhaust diffuser from a gas turbine engine is provided. The diffuser removal tool includes a pair of support arms, a clamp and wedge assembly coupled to an exhaust diffuser, a lead screw assembly coupled between the pair of support arms and to the clamp and wedge assembly via a wedge of the clamp and wedge assembly. The diffuser removal tool also includes a pair of linear bearing assemblies coupled to the pair of support arms and to the clamp and wedge assembly via wedges of the clamp and wedge assembly. The lead screw assembly is configured to displace the exhaust diffuser from the gas turbine in an axial direction relative to a longitudinal axis of the gas turbine engine while the pair of linear bearing assemblies are configured to both enable the displacement of the exhaust diffuser in the axial direction while vertically supporting the exhaust diffuser to maintain alignment between the diffuser and the gas turbine engine.

In yet another embodiment, a diffuser removal tool for displacing an exhaust diffuser from a gas turbine engine is provided. The diffuser removal tool includes a pair of support arms. The diffuser removal tool also includes a clamp and wedge assembly configured to couple to an exhaust diffuser, wherein the clamp and wedge assembly includes multiple wedges and a clamp. The clamp is configured to be circumferentially disposed about the exhaust diffuser. The multiple wedges are configured to be disposed between the clamp and the exhaust diffuser. The diffuser removal tool further includes a lead screw assembly coupled between the pair of support arms and to the clamp and wedge assembly via a first wedge of the multiple wedges. The lead screw assembly includes a lead screw assembly and a threaded nut coupled to the first wedge. The lead screw is configured to be rotated to adjust an axial position of the exhaust diffuser along a longitudinal axis of the gas turbine engine via axial displacement of the threaded nut along the lead screw. The diffuser removal tool still further includes a first linear bearing coupled to a first support arm of the pair of support arms and to a second wedge of the multiple wedges. The diffuser removal tool yet further includes a second linear bearing attached to a second support arm of the pair of support arms and a third wedge of the multiple wedges. The first and second linear bearing assemblies each includes a linear bearing and a linear bearing slide rod that are configured to enable displacing the exhaust diffuser in the axial direction while vertically supporting the exhaust diffuser to maintain axial alignment between the exhaust diffuser and the gas turbine engine.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 10 is a perspective view illustrating an embodiment of a linear bearing assembly of a diffuser removal tool;

DETAILED DESCRIPTION

Figure 1:
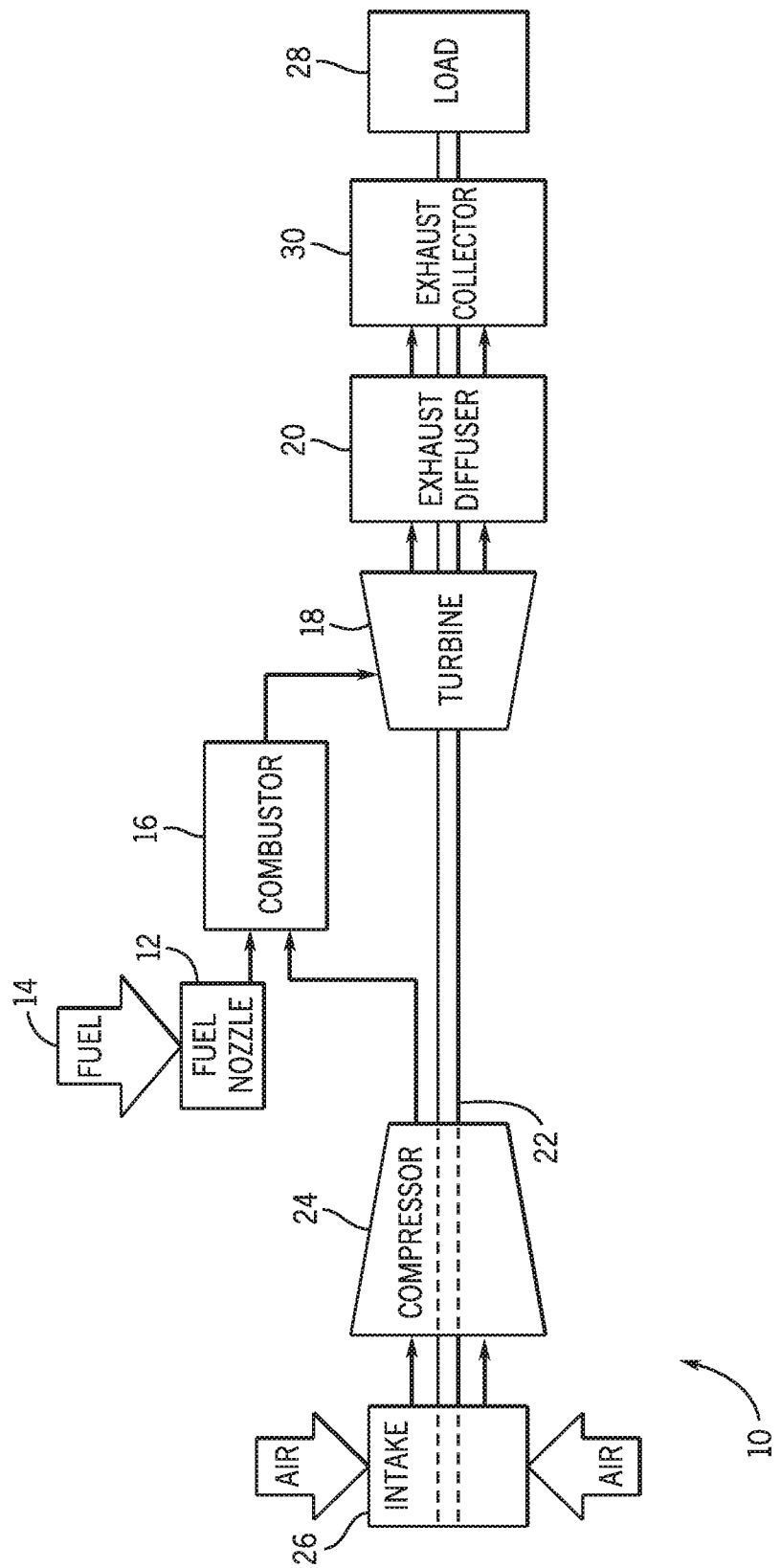
FIG. 1 is a block diagram of an embodiment of a turbine system with an exhaust diffuser and exhaust collector that utilizes a diffuser removal tool.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to a diffuser removal tool that is coupled to an exhaust collector and an exhaust diffuser and is configured to displace the exhaust diffuser further into the exhaust collector in an axial direction relative to a longitudinal axis of a gas turbine engine system. The diffuser removal tool is coupled to the exhaust collector via a pair of side supports that are coupled to a pair of support arms that are disposed about an upper half of the diffuser removal tool. The pair of support arms are coupled together above the longitudinal axis via a lead screw assembly. The diffuser removal tool is further coupled to the exhaust diffuser via a clamp and wedge assembly. The diffuser removal tool is further coupled to the exhaust collector via a pair of linear bearing assemblies that are disposed along the pair of support arms, respectively, between the pair of side supports and the lead screw assembly. The pair of linear bearing assemblies aid in the support of the exhaust diffuser as it is displaced in the longitudinal direction and, along with the lead screw assembly, resist a tilting torque of the diffuser when disconnected from a turbine rear frame. Therefore, when a lead screw of the lead screw assembly is rotated and a nut moves along the length of the lead screw in the axial direction, the clamp and wedge assembly, the pair of liner bearings, and the exhaust diffuser, all move in the axial direction relative to the longitudinal axis of the gas turbine engine system. In some embodiments, the diffuser removal tool may need an additional force, provided by an operator on lateral sides of the diffuser and tool, to overcome possible friction (e.g., friction from the linear bearing and lead screw assemblies). Overall, the diffuser removal tool will provide a support for the exhaust diffuser during disconnection from the turbine rear frame as well as enable a controlled axial displacement of the exhaust diffuser during maintenance activities (e.g., gas turbine removal, drive train alignment, etc.). Consequently, the diffuser removal tool will speed up a removal and reinstallation process of the exhaust diffuser from the turbine rear frame. The reduced removal and reinstallation time is due, in part, to an elimination of the need for an operator to enter the confined space of the exhaust collector which would require additional time to allow for the collector to cool to a suitable temperature. This will result in reduced plant downtime, increased plant availability, and increased safety.

Turning now to the figures, FIG. 1 is a block diagram of an embodiment of a turbine system 10 (e.g., gas turbine engine) that utilizes a diffuser removal tool. The turbine system 10 may use liquid or gas fuel, such as distillate fuel, natural gas and/or a hydrogen rich synthetic gas, to drive the turbine system 10. As depicted, the fuel nozzles 12 intake a fuel supply 14, mix the fuel with air, and distribute the fuel-air mixture into a combustor 16 in a suitable ratio for optimal combustion, emissions, fuel consumption, and power output. The turbine system 10 may include fuel nozzles 12 located inside one or more combustors 16. The fuel-air mixture combusts in a chamber within the combustor 16, thereby creating hot pressurized exhaust gases. The combustor 16 directs the exhaust gases through a turbine 18 toward an exhaust diffuser 20. As the exhaust gases pass through the turbine 18, the gases force turbine blades to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a gas compressor in a refinery, for example. The load 28 may include any suitable device capable of being powered by the rotational output of the turbine system 10. An exhaust collector 30 may be used to capture and redirect exhaust exiting the gas turbine engine. The diffuser 20 may be partially disposed within the exhaust collector 30. As described in greater detail below, a diffuser removal tool may be utilized to remove (e.g., axially displace) diffuser 20 from a rear frame of the turbine 18, while vertically supporting the diffuser 20 to maintain axial alignment between the diffuser 20 and the rest of the gas turbine engine (e.g., between respective central axes). The diffuser removal tool is configured to reduce the time for removal and reinstallation of the diffuser while stabilizing the diffuser to increase safety.

Figure 2:
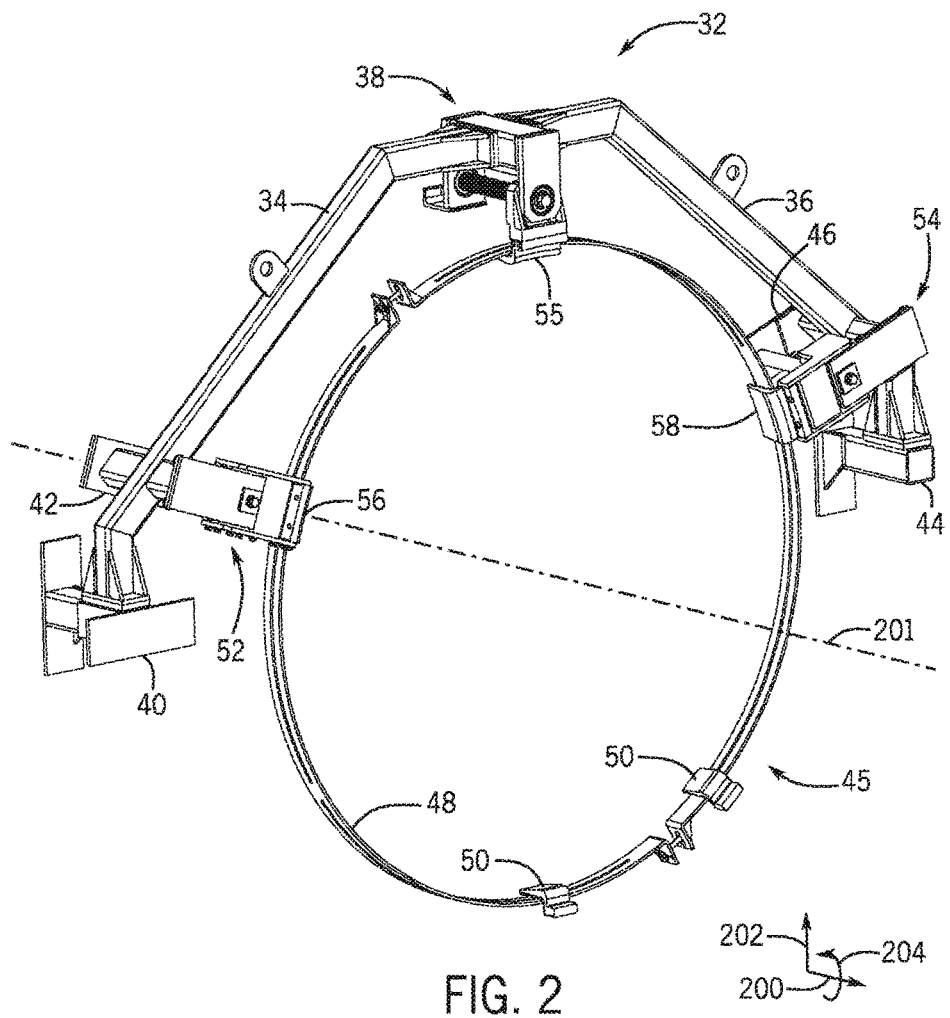
FIG. 2 is a perspective view illustrating an embodiment of a diffuser removal tool.

FIG. 2 is a perspective view illustrating an embodiment of a diffuser removal tool 32. The diffuser removal tool 32 includes a pair of support arms 34, 36, a pair of side supports 40, 44, a lead screw assembly 38, a pair of linear bearing assemblies 52, 54, and a clamp and wedge assembly 45. In this embodiment, the support arms 34, 36 have a rectilinear shape with angled bends. However, in some embodiments the supports arms 34, 36 may also include curved portions. As depicted, the support arms 34, 36 include a rectilinear cross section. In some embodiments, the support arms 34, 36 may have circular or oblong cross sections. The pair support arms 34, 36 may be disposed substantially about an upper half of the tool 32. However, in other embodiments, the support arms may be disposed about only a portion of the upper half of the tool 32, or about a portion of a different section other than the upper half of the tool 32. The pair of support arms 34, 36, may be coupled together via the lead screw assembly 38 located generally above a longitudinal axis 201 of the gas turbine engine 10 to help provide for an even distribution of weight. The tool 32 is coupled to the collector 30 through a first side support 40, a first linear bearing support 42, a second side support 44, and a second linear bearing support 46. The supports 40, 42, 44, 46 may be coupled to the collector 30 through bolts, screws, a different attachment method, or any combination thereof. In some embodiments, there may be two or more supports coupling the tool 32 to the collector 30. The tool 32 is coupled to the diffuser 20 through a clamp 48 and a plurality of wedges 50 of the clamp and wedge assembly 45. The lead screw assembly 38, a first linear bearing assembly 52, and a second linear bearing assembly 54, may be coupled to the diffuser 20 through a first wedge 55, a second wedge 56, and a third wedge 58 of the plurality of wedges 50, respectively, as well as the clamp 48. The first wedge 55, second wedge 56, and third wedge 58 of the plurality of wedges 50 may be modified and different than the rest of the plurality of wedges 50 to accommodate the coupling to the lead screw assembly 38, first linear bearing assembly 52, and second linear bear assembly 54, respectively. The modification of the first, second, and third wedges 55, 56, 58 may take the form of holes for attachment methods, a wider shape, a different material, and so forth. The clamp 48 of the clamp and wedge assembly 45 may be disposed in a circumferential direction 204 about an outer surface of the diffuser 20. The clamp 48 may be divided into halves, quarters, thirds, be a whole piece, or have a break in an otherwise complete circle disposed circumferentially 204 about the diffuser 20. The number of wedges 50 of the clamp and wedge assembly 45 may vary between 3 and 20 or any other number. A slot (discussed in further detail below) may be disposed in the middle of the clamp 48, extending in a circumferential direction 204 about the length of the clamp 48. Each wedge of the plurality of wedges 50 may include a protrusion (discussed in further detail below) extending in a radial direction 202 through the slot relative to the longitudinal axis 201 to align the wedge of the plurality of wedges 50. The protrusion, which may be an embedded threaded bolt extending through the slot, may be configured (i.e., threaded) to receive a fastening mechanism (e.g., nut, wing nut, etc.) to secure a wedge of the plurality of wedges 50 onto the clamp 48.

As described above, the lead screw assembly 38 and pair of linear bearing assemblies 52, 54 are coupled to the diffuser 20 through the clamp and wedge assembly 45 via the first, second and third wedge 55, 56, 58. The wedges 55, 56, 58 are coupled to the assemblies 38, 52, 54 via a nut, and a pair of linear bearings, respectively (nut and linear bearings are discussed in further detail below). When a lead screw of the lead screw assembly 38 is rotated, a nut moves along the length of the lead screw in the axial direction 200 with respect to the longitudinal axis 201. The linear bearings of the linear bearing assemblies 52, 54 also move in the same axial direction 200 as the nut by sliding on slide rods of the linear bearing assemblies 52, 54 when the lead screw is rotated. Therefore, the nut and linear bearings, together with the clamp and wedge assembly 45 and diffuser 20, move in unison in the axial direction 200 with respect to the longitudinal axis 201. During the movement in the axial direction 200, the diffuser's longitudinal axis is kept in line with the longitudinal axis 201 of the gas turbine system while the tool 32 supports the diffuser 20 in the vertical direction. In some embodiments, no single element of the tool 32 may be greater than 50 pounds (22.7 kg) in weight.

Figure 3:
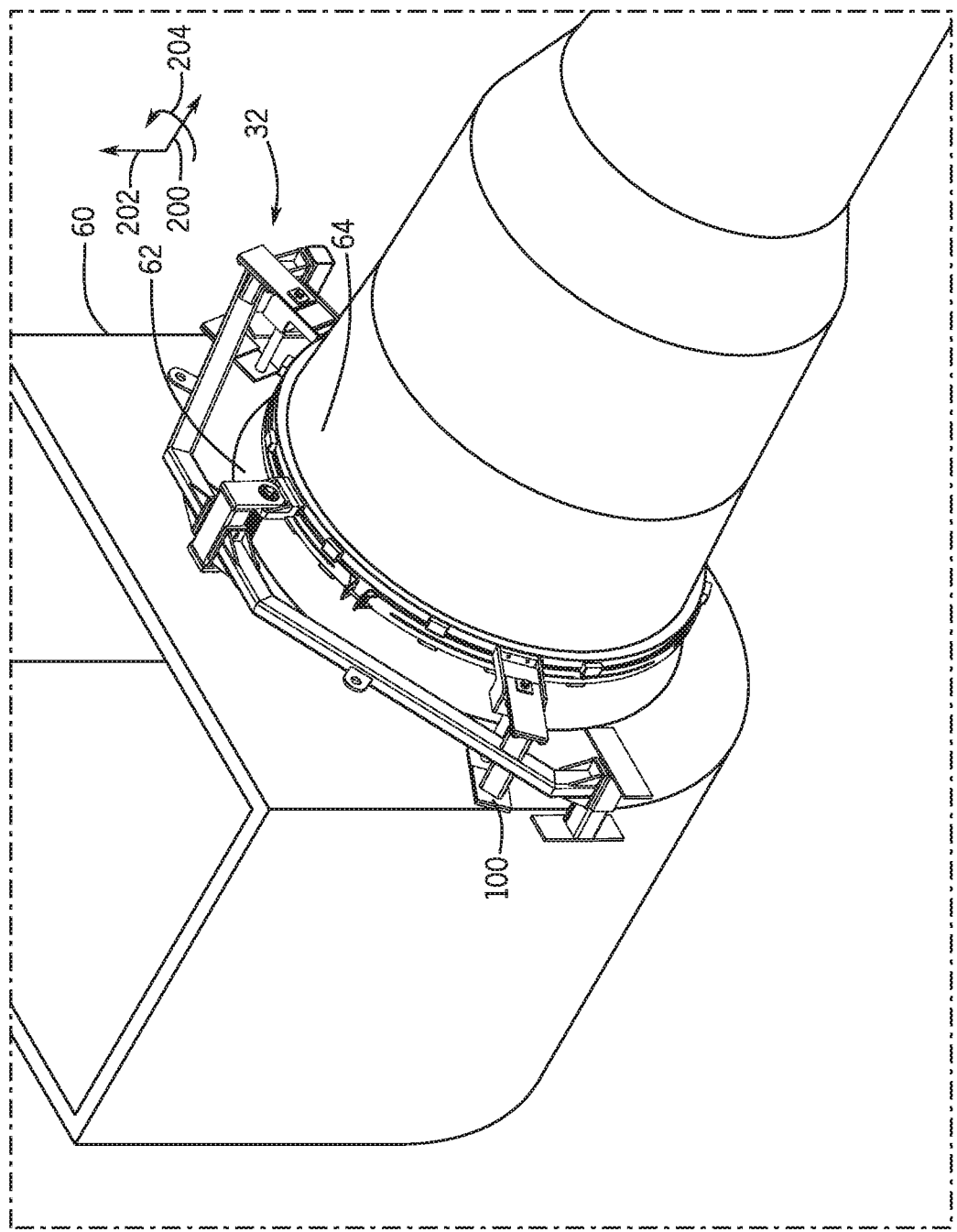
FIG. 3 is a perspective view illustrating an embodiment of a diffuser removal tool coupled to an exhaust collector and an exhaust diffuser.

FIG. 3 is a perspective view illustrating an embodiment of the diffuser removal tool 32 coupled to an exhaust collector 60 and an exhaust diffuser 62. Indeed, the collector 60 and the diffuser 62 may be similar to the collector 30 and diffuser 20 of FIG. 1. In some embodiments, the tool 32 may be coupled to and applied to any objects with round cross sections that could benefit from controlled axial movement.

The diffuser 62 may be partially disposed within the collector 60 as is shown. The diffuser 62 may also be further in or further out of the collector 60. The collector 60 may be a vertical outlet exhaust collector, horizontal outlet exhaust collector, and so forth. In this view of the diffuser removal tool 32, the diffuser 62 is coupled to the turbine rear frame 64 and is partially disposed within the collector 60. However, the diffuser 62 may be decoupled from the turbine rear frame 64 and displaced further into the collector 60 in an axial direction 200 relative to a longitudinal axis of the gas turbine engine. For example, when a lead screw of the lead screw assembly 38 is rotated, a nut moves along the length of the lead screw in the axial direction 200 with respect to the longitudinal axis 201. The linear bearings of the linear bearing assemblies 52, 54 also move in the same axial direction 200 as the nut by sliding on slide rods of the linear bearing assemblies 52, 54 when the lead screw is rotated. Therefore, the nut and linear bearings, together with the clamp and wedge assembly 45 and diffuser 62, move in unison in the axial direction 200 with respect to the longitudinal axis 201, thereby displacing the diffuser 62 further into the collector 60. During the movement in the axial direction 200, the diffuser's longitudinal axis is kept in line with the longitudinal axis 201 of the gas turbine system.

Figure 4:
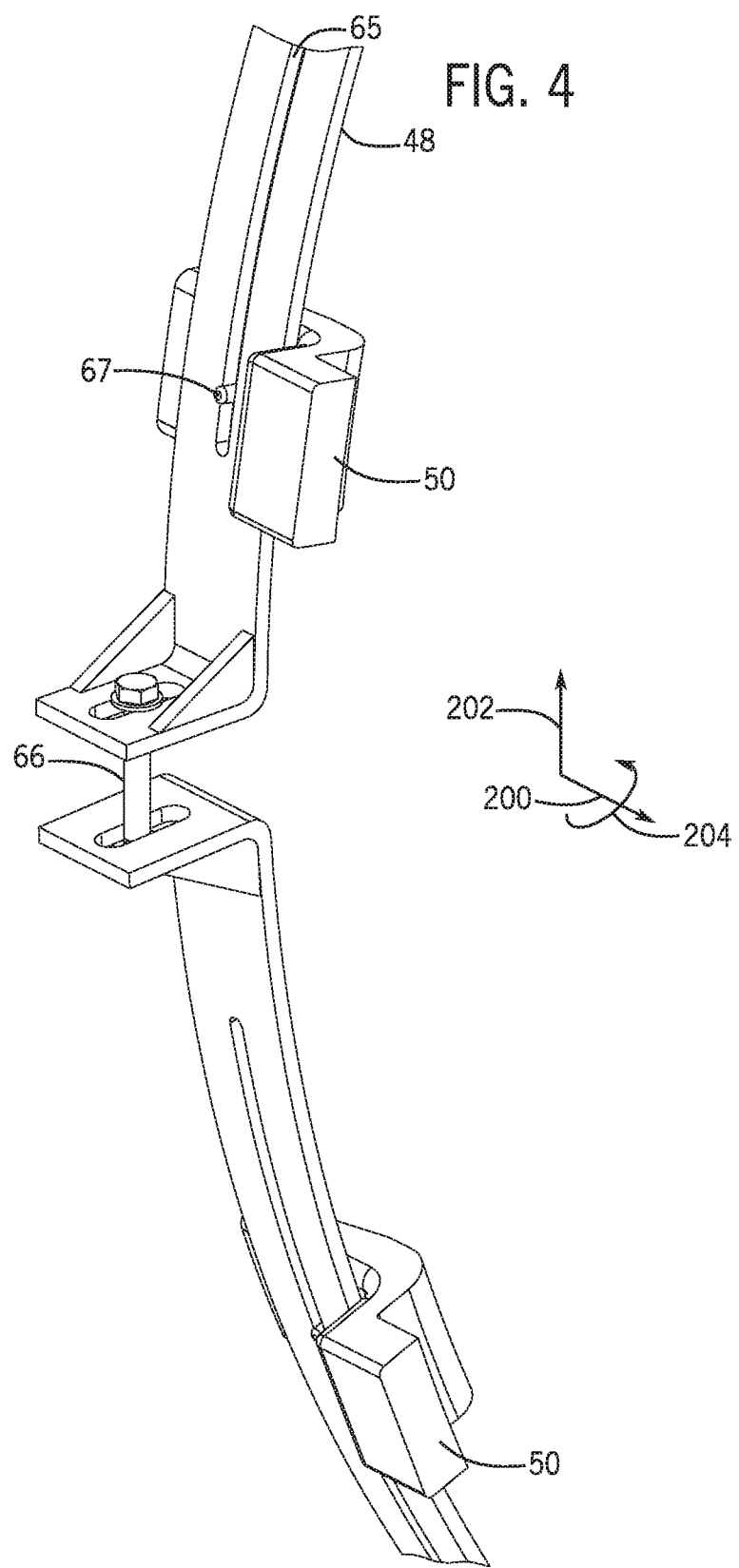
FIG. 4 is a perspective view illustrating an embodiment of a portion of a clamp and wedge assembly of a diffuser removal tool.

FIG. 4 is a perspective view illustrating an embodiment of a portion of the clamp and wedge assembly 45. A slot 65 extends circumferentially 204 relative to the longitudinal axis 201 of the gas turbine engine through the length of the clamp 48. In some embodiments, the clamp 48 is in two halves and tightened via a clamp bolt 66. There may be a similar bolt on the opposite side of this view of clamp 48. In this embodiment the halves of the clamp 48 are disposed about a top half and bottom half of the diffuser 62, respectively. The halves of the clamp may be in some other position instead, such as on a left and a right side of the diffuser 62. In some embodiments, the clamp could have more portions, be one continuous piece, or be continuous with a single break where one would tighten the clamp 48 via a clamp bolt similar to clamp bolt 66. Some or all of the wedges of the plurality of wedges 50 may include a protrusion 67, which may be an embedded threaded bolt, extending from a surface of the wedges and through the slot 65. The protrusion 67 may be threaded to receive a nut (not shown), e.g., a wing nut, to secure the clamp 48 to the surface of the wedge. The protrusion 67 may be an extension of the material of the wedge. However, the protrusion 67 may instead be an embedded threaded metal bolt that extends from a bottom surface of the wedge, through the top of the wedge, and through the clamp slot 65 to receive the threaded nut, e.g., wing nut.

Figure 5:
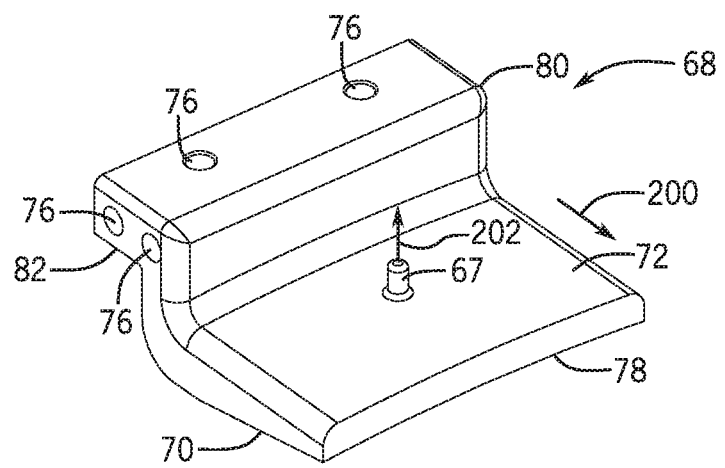
FIG. 5 is a perspective view illustrating an embodiment of a wedge of a clamp and wedge assembly of a diffuser removal tool.

FIG. 5 is a perspective view illustrating an embodiment of a wedge 68 of the plurality of wedges 50. The wedge 68 may be formed using additive manufacturing methods. Indeed, in other embodiments the wedge 68 may be manufactured utilizing casting, molding, forming, machining, joining, and so on. The wedge 68 may be composed of a plastic, metal, or any combination thereof. The underside 70 (not visible in this perspective) may be shaped to fit the curve of the diffuser 62 on which it may be disposed. The clamp 48 may be disposed on a top surface 72 of the wedge 68. Therefore, the top surface 72 may also be curved to better fit the clamp 48. Furthermore, the wedge 68 may be generally curved to be circumferentially disposed about a portion of an outer surface of the diffuser 62 and may be generally tapered starting from the base of the flange 80 to the opposite end in the axial direction 200 to fit a taper of the diffuser 62. The clamp 48 may fit so that a protrusion 67 fits through the clamp 48 as is shown in FIGS. 2-4 so that a fastener, e.g., wing nut, may be attached. In some embodiments, the protrusion 67 may be embedded in the wedge 68 and extend radially 202 relative to the longitudinal axis 201 of the gas turbine engine with a portion of the protrusion 67 fitting into the clamp 48 through a slot 65 to align the wedge 68 with the clamp 48. The wedge 68 may also include a hole specifically shaped, e.g., in the shape of a hexagon, to enable the protrusion 67, a bolt, a nut, or a combination thereof to be embedded in the wedge 68. Further, the hole may be shaped to block rotational movement of the protrusion 67, the bolt, the nut, or the combination thereof. The rotational movement may be blocked when the fastener is being tightened over the wedge 68 and clamp 48. In some embodiments, the fastener, which may be in the form of a nut, may fit over the clamp 48 to secure the clamp 48 onto the wedge 68. Some of the wedges of plurality of wedges (e.g., first wedge 55, second wedge 56, and third wedge 58) may have a plurality of attachment holes 76 to allow the coupling of the lead screw assembly 38, first linear bear assembly 52, and second linear bearing assembly 54 as described above. The plurality of attachment holes 76 may have embedded hardware, e.g., threaded nuts, threaded bolts, threaded inserts, rods, etc., to facilitate the coupling of the assemblies 38, 52, 54. The wedge 68 may also have a varying arcuate length 78 corresponding to a purpose of that particular wedge of the plurality of wedges 50. The purpose of a wedge 68 may vary based at least on its location in relation to the tool 32 or which element of the tool 32 that the wedge 68 is coupled to. For example, if a wedge 68 of the plurality of wedges 50 is coupled to the lead screw assembly 38, the first linear bearing assembly 52, or the second linear bearing assembly 54, (e.g., first wedge 55, second wedge 56, or third wedge 58, respectively) the wedge 68 may have a longer arcuate length 78 than if it were not coupled to one of those elements or a similar element. Furthermore, the wedge 68 may include a flange 80 to press against an outer lip 84 of the diffuser 62 with an underside of the flange 82 resting on the lip 84 of the diffuser 62 to restrict movement of the wedge 68 and clamp 48 in the axial direction 200 relative to the diffuser 62 as is generally displayed in FIG. 6.

Figure 6:
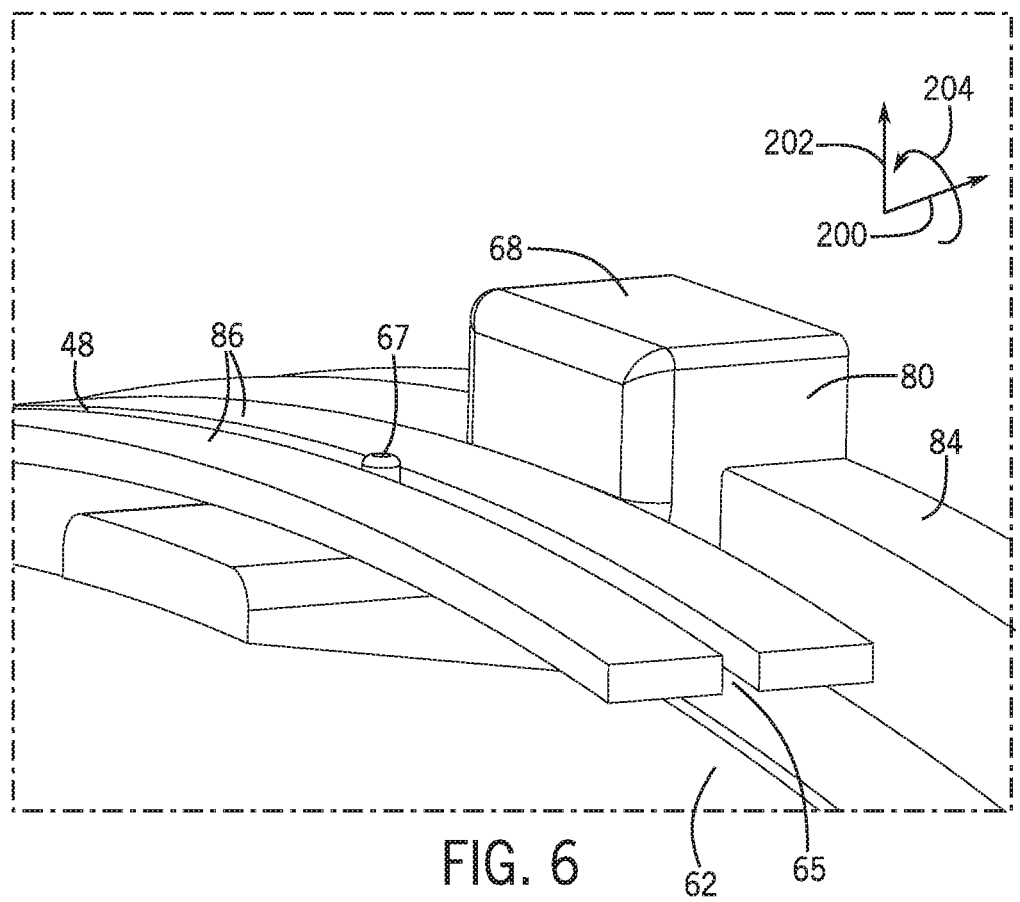
FIG. 6 is a perspective view illustrating an embodiment of a portion of a clamp and wedge assembly of the diffuser removal tool coupled to an exhaust diffuser.

FIG. 6 is a perspective view illustrating an embodiment of the wedge 68 disposed on the exhaust diffuser 62 between the exhaust diffuser 62 and the clamp 48. The clamp 48 holds the wedge 68 against a surface of the diffuser 62. The protrusion 67 may be an extension of the wedge 68 extending radially or a bolt embedded into the wedge 68 and extending radially 202 with respect to the longitudinal axis 201 of the gas turbine engine through the wedge 68. In this embodiment, the protrusion 67 (i.e., embedded hardware or extension of the wedge 68) may be threaded and fits in between sections of the clamp 48 (i.e., through a slot 65) to align the wedge 68 with the clamp 48. To secure the clamp 48 onto the wedge 68, a nut (e.g., wing nut) or other fastening mechanism (not shown) may be disposed about and around the protrusion 67. When the clamp bolt 66 is tightened, the fastening mechanism may be tightened until a bottom surface of the fastening mechanism is pressed against outer surfaces 86 of the clamp 48, thereby securing the clamp 48 to the wedge 68, thereby securing the wedge 68 to the diffuser 62. Furthermore, although not shown in this embodiment of the wedge 68, the flange 80 may contain a plurality of attachment holes 76 to allow the coupling of elements of the tool 32 to the wedge 68. The attachment holes may include embedded hardware to facilitate the coupling of the elements of tool 32 to wedge 68. Indeed, there is no need for holes in the diffuser lip 84 when coupling the tool 32 to the diffuser 62 which would provide for unnecessary possible leak points and complexity in the diffuser 62.

Figure 7:
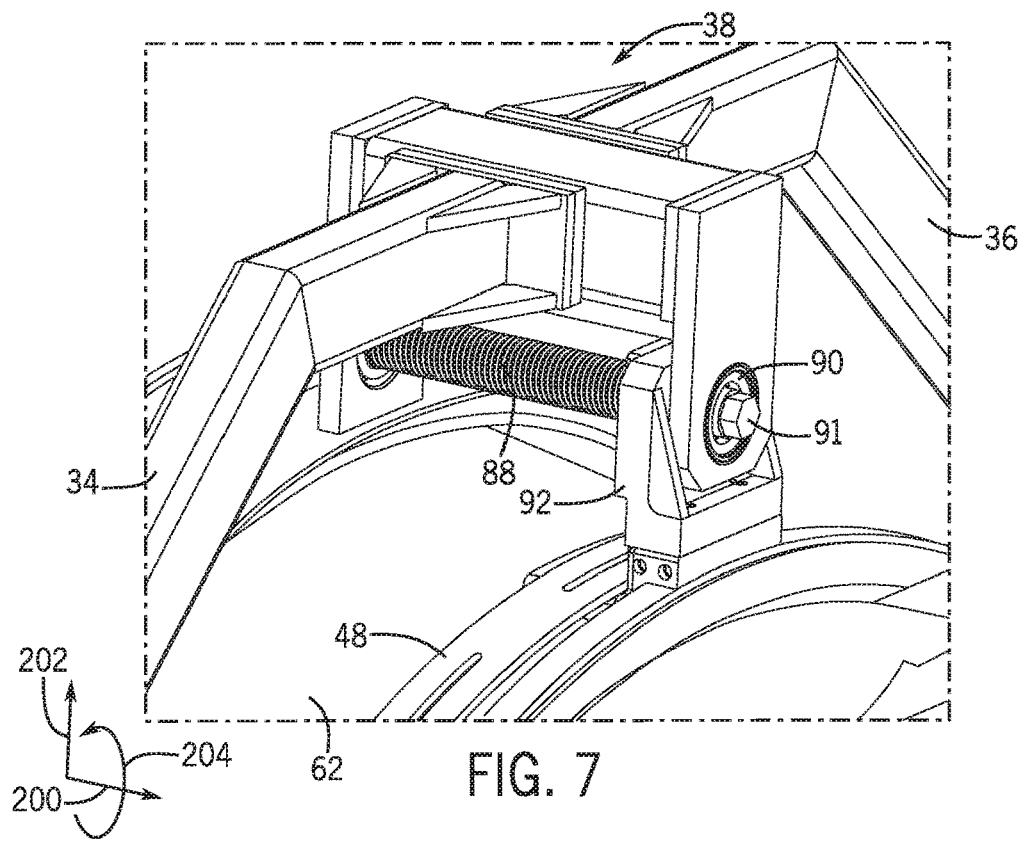
FIGS. 7 and 8 are perspective views illustrating embodiments of a lead screw assembly of a diffuser removal tool coupled to an exhaust diffuser.
Figure 8:
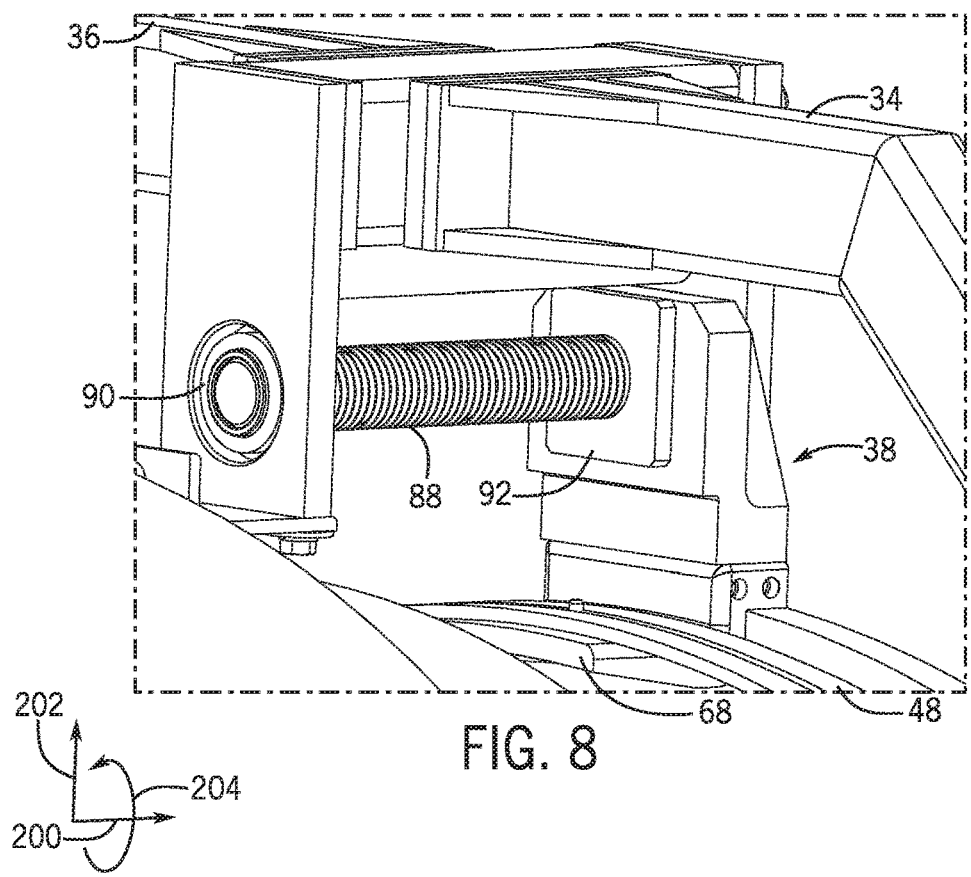

FIGS. 7 and 8 are perspective views illustrating embodiments of the lead screw assembly 38 coupled to the exhaust diffuser 62. The lead screw assembly 38 includes a lead screw 88 that is supported on both ends by a bearing 90. The lead screw 88 may rotate while supported by the bearings 90. The lead screw 88 is rotatable by the means of an external force rotating the rotating point 91. When the lead screw 88 is rotated, a nut (e.g., threaded nut) 92 may move along the length of the lead screw 88 in the axial direction 200 with respect to the longitudinal axis 201. The linear bearings of the linear bearing assemblies 52, 54 also move in the same axial direction 200 as the nut 92 by sliding on slide rods of the linear bearing assemblies 52, 54 when the lead screw is rotated. Therefore, the nut 92 and linear bearings, together with the clamp and wedge assembly 45 and diffuser 62 (moving parts of the tool 32), move in unison in the axial direction 200 with respect to the longitudinal axis 201, thereby displacing the diffuser 62 further into the collector 60. Between the bearings 90, there may be approximately 8 inches (0.203 meters) of the lead screw 88 on which the nut 92 may move along. Therefore, when the lead screw 88 is rotated, the moving parts of the tool 32, as described above, may move approximately 8 inches (0.203 meters) in either direction along a parallel axis relative to the lead screw 88 thereby moving the diffuser 62 in the same direction. In some embodiments, there may be more than 8 inches of space between the bearings 90, providing for more than 8 inches (0.203 meters) of the displacement of the moving parts of the tool 32 and the diffuser 62. However, the amount of available space between the bearings 90, i.e., the distance that the moving parts of the tool 32 and the diffuser 62 can be displaced, may vary based on design of the tool 32, the diffuser 62, and/or the proximity of the collector 60.

Figure 9:
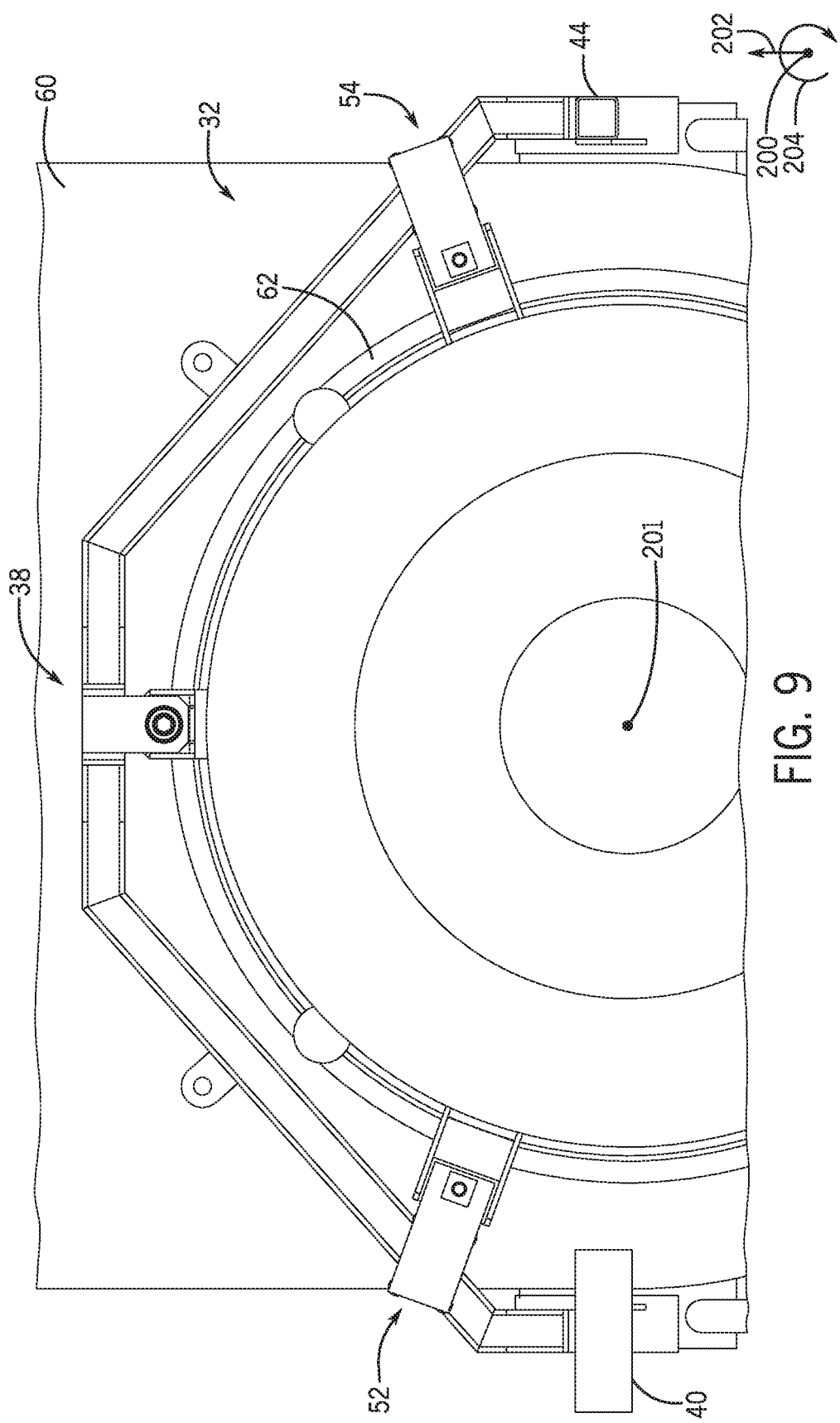
FIG. 9 is an end view illustrating an embodiment of a diffuser removal tool coupled to an exhaust collector and an exhaust diffuser.

FIG. 9 is an end view illustrating an embodiment of the diffuser removal tool 32 coupled to the exhaust collector 60 and the exhaust diffuser 62. In some embodiments of the tool 32, in relation to a longitudinal axis 201 of the gas turbine engine 10, the lead screw assembly 38 is in a position directly above the longitudinal axis 201. With the position of the lead screw assembly 38 in respect to the longitudinal axis 201 as a reference point, the first side support 40 may be in a position 90 degrees counterclockwise and the second side support 44 may be in a position 90 degrees clockwise. The side supports 40, 44 are configured to be coupled to both the collector 60 and the support arms 34, 36. With the position of the lead screw assembly 38 in respect to the longitudinal axis 201 as a reference point, the first linear bearing assembly 52 may be in a position between 1 and 89 degrees counterclockwise, and the second linear bearing assembly 54 may be in a position between 1 and 89 degrees clockwise. In other embodiments, the first and second linear bearing assembly 52, 54 may be in disposed in a portion beyond 89 degrees clockwise or counterclockwise and the first and second side supports 40, 44 may be in a position either less than or greater than the linear bearings assemblies 52, 54 with respect to lead screw assembly 38 in a clockwise or counterclockwise direction. In this embodiment the tool 32 is disposed about an upper half of the diffuser 62 in a circumferential direction 204. In other embodiments, the tool 32 may extend into a bottom half of the diffuser 62 in a circumferential direction 204. In further embodiments, the tool 32 may only be disposed about a portion of the upper half of the diffuser 62 in a circumferential direction 204.

FIG. 10 is a perspective view illustrating an embodiment of a linear bearing assembly 98. Indeed, the linear bearing assembly 98 may be an embodiment of the first and second linear bearing assemblies 52, 54. FIG. 10 is a view from the side of the tool 32 that may be attached to the collector 60 via a collector attachment 100. In some embodiments, the collector attachment 100 may be bolted to a face of the collector 60. A linear bearing (e.g., linear motion bearing) 102 of the linear bearing assembly 98 is coupled to the wedge 68. The linear bearing assembly 98 may also support the exhaust diffuser 62 in a vertical direction and only enables linear motion in the axial direction 200 with respect to the longitudinal axis 201 of the gas turbine engine. The wedge 68 is further coupled to the diffuser 62 via the clamp 48 as described above. Therefore, when the lead screw 88 is rotated and the nut 92 moves along its length, the linear bearing 102 moves along a slide rod 104 in a direction parallel to the nut 92 along the lead screw 88, thereby moving the moving parts of the tool 32 and diffuser 62.

Figure 12:
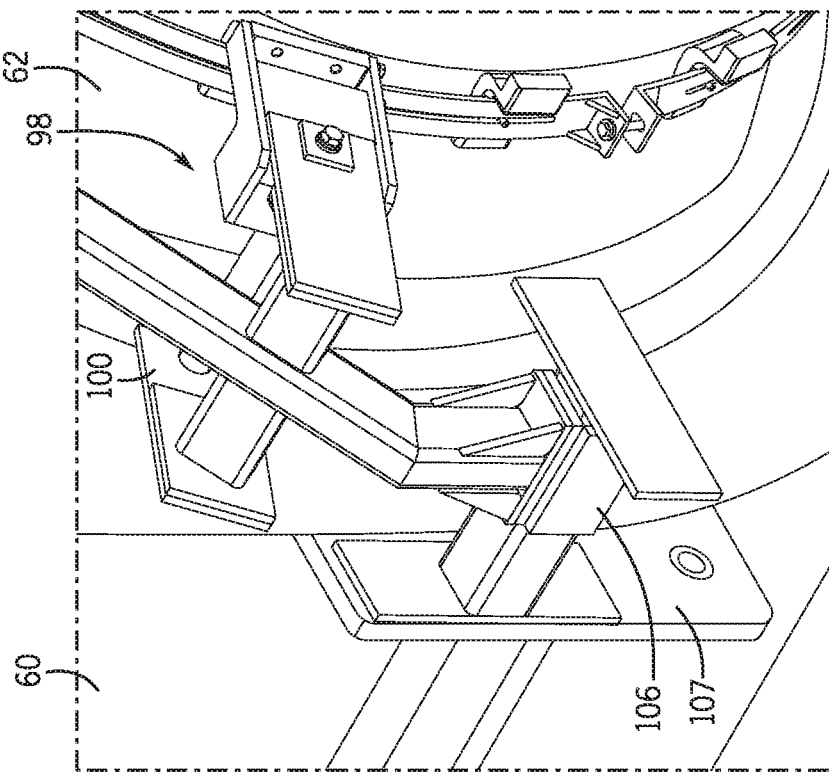
FIG. 12 is a perspective view illustrating an embodiment of a side support (e.g., for a horizontal outlet exhaust collector) of a diffuser removal tool.
Figure 11:
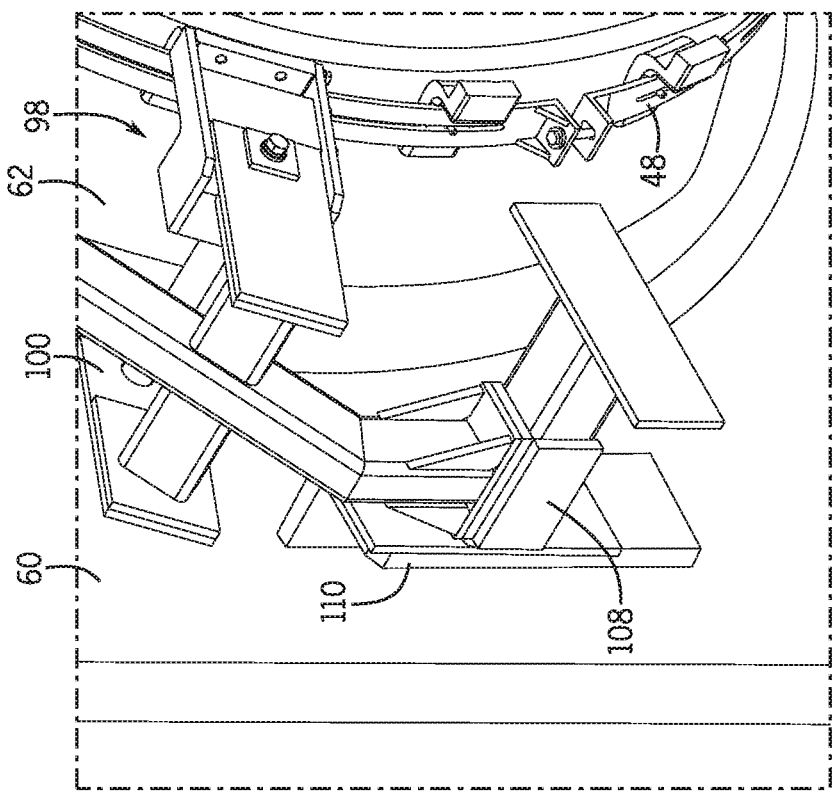
FIG. 11 is a perspective view illustrating an embodiment of a side support (e.g., for a vertical outlet exhaust collector) of a diffuser removal tool.

FIGS. 11 and 12 are perspective views illustrating embodiments of the side supports 40, 44. The configuration of the side supports 40, 44 may depend on the type of exhaust collector 60 to which the tool 32 may be coupled. FIG. 11 is a view of an embodiment of a side support 40, 44 for a vertical outlet exhaust collector. The vertical outlet collector side support 106 may be configured to couple to a vertical outlet exhaust collector and support arms 34, 36 of the tool 32. For the vertical outlet collector side support 106, the tool 32 may be coupled to a vertical outlet exhaust collector leveling support bracket 107 about the collector 60. FIG. 12 is a view of an embodiment of a side support 40, 44 for a horizontal outlet exhaust collector. A horizontal outlet collector side support 108 may be configured to couple to a vertical outlet exhaust collector and support arms 34, 36 of the tool 32. For the horizontal outlet collector side support 108, the tool 32 may be coupled to the collector 60 via a horizontal outlet exhaust collector leveling support bracket 110, or directly to the collector 60. Furthermore, the support arms 34, 36 of the tool 32 may be disposed closer to the collector 60 on the side supports 40, 44 in the embodiment utilizing a vertical outlet exhaust collector than in the embodiment utilizing a horizontal outlet exhaust collector. Furthermore, the side supports 40, 44 of the tool 32 may be adjusted (e.g., rotated) to fit either a vertical outlet exhaust collector or a horizontal outlet exhaust collector.

Figure 13:
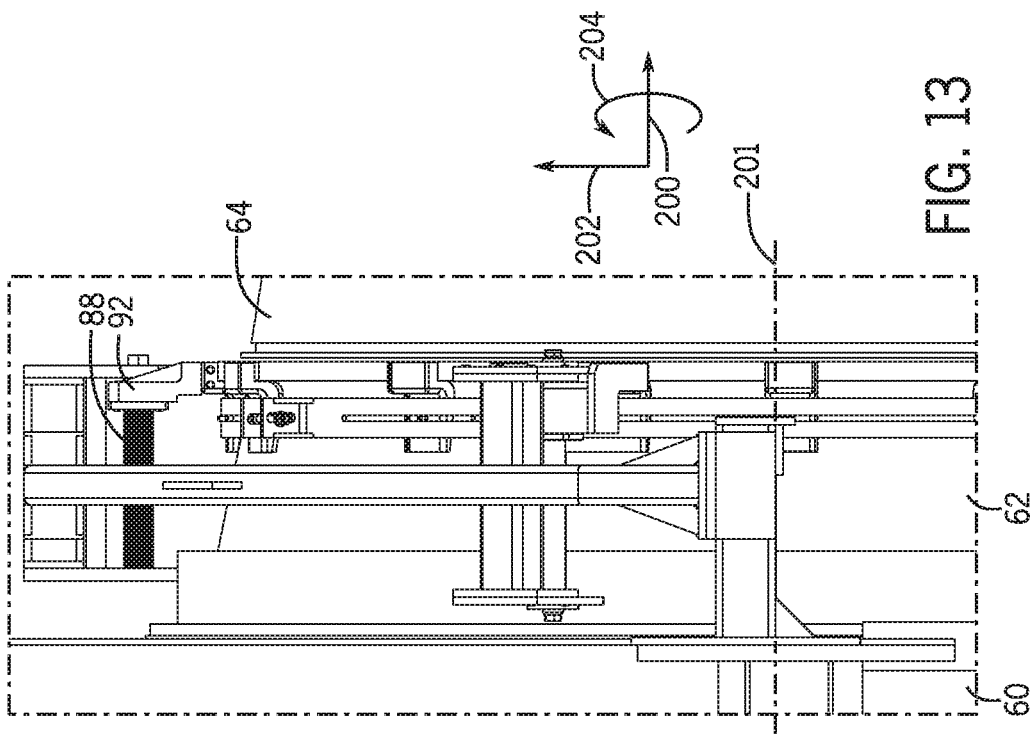
FIG. 13 is a side view of a diffuser removal tool, an exhaust collector, and an exhaust diffuser coupled to a gas turbine.

FIG. 13 is a side view of the diffuser removal tool 32, the exhaust collector 60, and the exhaust diffuser 62 coupled to a gas turbine rear frame 64. As described above, when the lead screw 88 is rotated, the nut (e.g., threaded nut) 92 may move along the length of the lead screw 88 in the axial direction 200 with respect to the longitudinal axis 201. The linear bearings 102 of the linear bearing assemblies 52, 54 also move in the same axial direction 200 as the nut 92 by sliding on the slide rods 104 of the linear bearing assemblies 52, 54 when the lead screw 88 is rotated. Therefore, the nut 92 and linear bearings 102, together with the clamp and wedge assembly 45 and diffuser 62, move in unison in the axial direction 200 with respect to the longitudinal axis 201, thereby displacing the diffuser 62 further into the collector 60.

Figure 14:
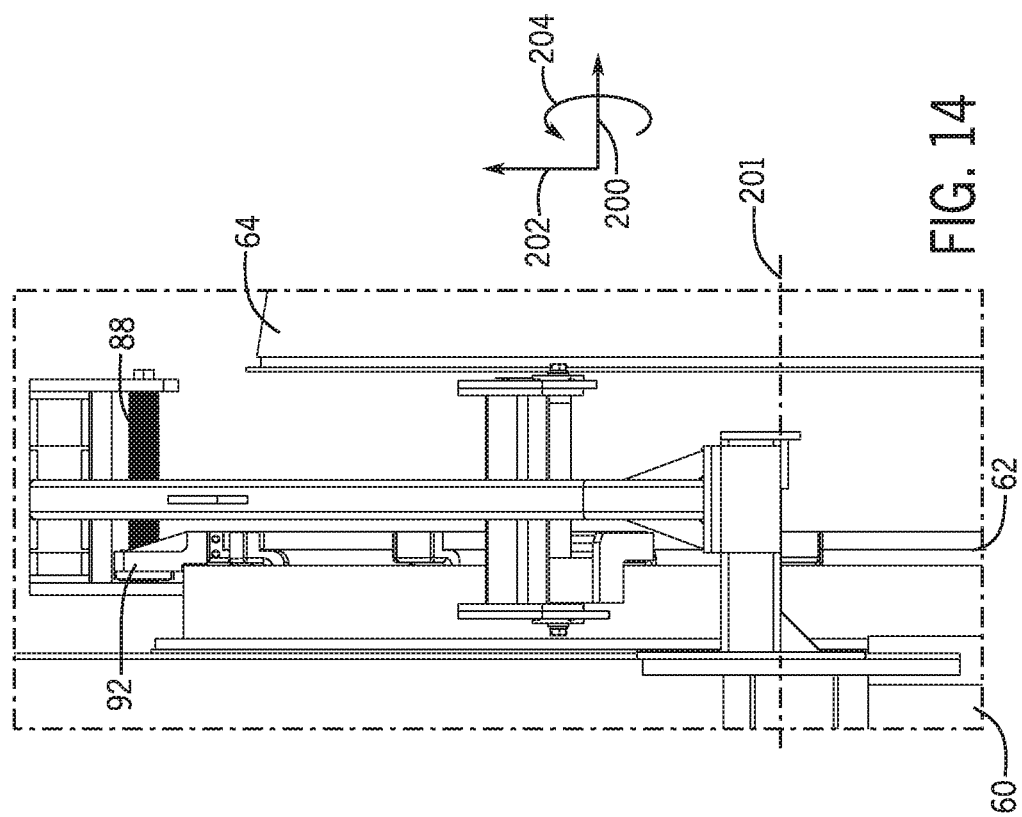
FIG. 14 is a side view of a diffuser removal tool, an exhaust collector, and an exhaust diffuser having been displaced into the exhaust collector via the diffuser removal tool.

FIG. 14 is a side view of the diffuser removal tool 32, exhaust collector 60, and the exhaust diffuser 62 having been displaced some amount into an exhaust collector 60. FIG. 14 is an embodiment of the system after the tool 32 of FIG. 13 has been displaced some in the axial direction 200 further into the collector 60. As described above, this displacement is caused by the lead screw 88 being rotated, the nut (e.g., threaded nut) 92 moving along the length of the lead screw 88 in the axial direction 200 with respect to the longitudinal axis 201, the linear bearings 102 of the linear bearing assemblies 52, 54 also moving in the same axial direction 200 as the nut 92 by sliding on the slide rods 104 of the linear bearing assemblies 52, 54 when the lead screw 88 is rotated. Therefore, the nut 92 and linear bearings 102, together with the clamp and wedge assembly 45 and diffuser 62, move in unison in the axial direction 200 with respect to the longitudinal axis 201, thereby displacing the diffuser 62 further into the collector 60. Before, during, and after the displacement of the tool 32 and diffuser 62, axial alignment is maintained between the exhaust diffuser 62 and the gas turbine engine 10 (i.e., longitudinal axis 201) via the tool 32.

An embodiment of the process of assembling, disassembling, and operation of the diffuser removal tool 32 may be as described below. First, drill into appropriate mounting areas of the exhaust collector and mount the two side supports to the exhaust collector. Then attach the plurality of wedges and clamp assembly to the diffuser and assemble the lead screw assembly and mount to the two vertical arm supports. Next, bolt on the arm supports and lead screw assembly to the two side supports leaving the hardware loose at this time. Next, assemble the two linear bearing support assemblies and mount them to the vertical supports and align the linear bearings. Once the tooling has been installed, all hardware tightened, and the bolts connecting the diffuser to the turbine are removed, turn the lead screw on the lead screw assembly to move the threaded nut. This lead screw assembly is directly connected to the wedge and clamp assembly. Therefore, by turning the lead screw, the diffuser will slide up to 8 inches back into the exhaust collector with some guidance from maintenance crew to ensure the diffuser separates from the turbine rear frame. The diffuser will slide along two linear bearing support assemblies with one linear bearing support assembly disposed on an upper left half of the tool and the other linear bearing support assembly disposed on an upper right half of the tool. The lead screw assembly, along with the two linear support assemblies, provides support and stability against the tilting torque of the diffuser when disconnected from the turbine rear frame. This maneuver will leave the tunnel of the diffuser exposed and ready for disconnection. For reinstallation of the diffuser the opposite process needs to be followed. First, turn the lead screw assembly in the opposite direction as before to mate the diffuser to the turbine rear frame. The diffuser will slide along the linear support bearing assemblies towards the turbine rear frame. Once the diffuser meets the turbine rear frame, reconnect the diffuser to the turbine. Finally, once the diffuser is supported by the turbine rear frame the tool can be removed. Furthermore, due to the lightweight nature of the tool 32, there is not a need for equipment, such as a hoist, to assist in the assembling, disassembling, and operation of the tool 32.

Technical effects of the subject matter include providing a diffuser removal tool for a gas turbine engine to remove an exhaust diffuser from a gas turbine by displacing the exhaust diffuser further into an exhaust collector while providing vertical support and maintaining axial alignment with the gas turbine engine. The diffuser removal tool will speed up the process and increase safety of the removal the exhaust diffuser relative to traditional practices. This will result in the gas turbine engine downtime being reduced and the plant availability increasing.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gas turbine engine comprising an exhaust diffuser;
an exhaust collector coupled to the exhaust diffuser, wherein the exhaust diffuser is partially disposed within the exhaust collector; and
a diffuser removal tool configured to couple to both the exhaust collector and the exhaust diffuser and to separate the exhaust diffuser from the gas turbine engine by displacing the exhaust diffuser further into the exhaust collector in an axial direction relative to a longitudinal axis of the gas turbine engine while vertically supporting the exhaust diffuser to maintain axial alignment between the exhaust diffuser and the gas turbine engine.

2. The system of claim 1, comprising: a compressor, a combustor section, and a turbine.

3. The system of claim 1, wherein the diffuser removal tool comprises a clamp and wedge assembly coupled to the exhaust diffuser, wherein the clamp and wedge assembly comprises a plurality of wedges and a clamp, the clamp is circumferentially disposed relative to the longitudinal axis about the exhaust diffuser, and the plurality of wedges are disposed between the clamp and the exhaust diffuser.

4. The system of claim 3, wherein the clamp comprises a slot extending circumferentially relative to the longitudinal axis, and each wedge of the plurality of wedges comprises a threaded bolt embedded within a respective wedge to radially extend through the slot to align the wedge with the clamp.

5. The system of claim 3, wherein the diffuser removal tool comprises a lead screw assembly, wherein the lead screw assembly comprises a lead screw and a threaded nut coupled to a first wedge of the plurality of wedges, and wherein the lead screw is configured to be rotated to adjust an axial position of the exhaust diffuser along the longitudinal axis.

6. The system of claim 5, wherein the diffuser removal tool comprises a pair of support arms comprising a first support arm and a second support arm coupled to the lead screw assembly, and the pair of support arms extend circumferentially about a portion of the exhaust diffuser.

7. The system of claim 6, wherein the diffuser removal tool comprises a pair of linear bearing assemblies comprising a first linear bearing assembly and a second linear bearing assembly, the first linear bearing assembly being coupled to the first support arm and a second wedge of the plurality of wedges, and the second linear bearing assembly being coupled to the second support arm and a third wedge of the plurality of wedges, and wherein the first and second linear bearing assemblies each comprise a linear bearing and a linear bearing slide rod that are configured to enable displacing the exhaust diffuser further into the exhaust collector in the axial direction while vertically supporting the exhaust diffuser to maintain axial alignment between the exhaust diffuser and the gas turbine engine.

8. The system of claim 6, wherein the diffuser removal tool comprises a pair of side support assemblies comprising a first side support assembly and a second side support assembly, the first side support assembly being coupled to both the first support arm and the exhaust collector and the second side support assembly being coupled to both the second support arm and the exhaust collector.

9. The system of claim 3, wherein at least one wedge of the plurality of wedges is made of plastic.

10. The system of claim 9, wherein the at least one wedge is made via additive manufacturing to have a hole specifically shaped to enable a bolt, nut, or a combination thereof to be embedded within the at least one wedge and to block rotational movement of the bolt, nut, or a combination thereof.

11. The system of claim 9, wherein the at least one wedge is made via additive manufacturing with a bolt, nut, or a combination thereof embedded within the at least one wedge.

12. A diffuser removal tool for displacing an exhaust diffuser from a gas turbine engine, comprising:
a pair of support arms;
a clamp and wedge assembly configured to couple to an exhaust diffuser;
a lead screw assembly coupled between the pair of support arms and to the clamp and wedge assembly via a wedge of the clamp and wedge assembly; and
a pair of linear bearing assemblies coupled to the pair of support arms and to clamp and wedge assembly via wedges of the clamp and wedge assembly, wherein the lead screw assembly is configured to displace the exhaust diffuser from the gas turbine engine in an axial direction relative to a longitudinal axis of the gas turbine engine while the pair of linear bearing assemblies are configured to both enable the displacing the exhaust diffuser in the axial direction while vertically supporting the exhaust diffuser to maintain alignment between the diffuser and the gas turbine engine.

13. The diffuser removal tool of claim 12, comprising a pair of side support assemblies configured to couple the diffuser removal tool to an exhaust collector so that the diffuser removal tool can displace the exhaust diffuser in the axial direction into the exhaust collector, wherein the pair of side support assemblies comprises a first side support assembly coupled to a first support arm of the pair of support arms and a second side support assembly coupled to a second support arm of the pair of support arms.

14. The diffuser removal tool of claim 13, wherein the pair of side support assemblies are configured to couple the diffuser removal tool to a vertical outlet exhaust collector.

15. The diffuser removal tool of claim 13, wherein the pair of side support assemblies are configured to couple the diffuser removal tool to a horizontal outlet exhaust collector.

16. The diffuser removal tool of claim 12, wherein the clamp and wedge assembly comprises a plurality of wedges and a clamp, the clamp is configured to be circumferentially disposed about the exhaust diffuser, and the plurality of wedges are configured to be disposed between the clamp and the exhaust diffuser, and wherein the clamp comprises a slot extending circumferentially relative to the longitudinal axis, and each wedge of the plurality of wedges comprises a threaded bolt embedded within a respective wedge to radially extend through the slot to align the wedge with the clamp.

17. The diffuser removal tool of claim 12, wherein the lead screw assembly comprises a lead screw and a threaded nut coupled to the wedge of the clamp and wedge assembly, and wherein the lead screw is configured to be rotated to adjust an axial position of the exhaust diffuser along the longitudinal axis via axial displacement of the threaded nut along the lead screw.

18. The diffuser removal tool of claim 12, wherein the pair of support arms are configured to extend circumferentially about a portion of the exhaust diffuser.

19. The diffuser removal tool of claim 12, wherein the pair of linear bearing assemblies comprises a first linear bearing assembly and a second linear bearing assembly, the first linear bearing assembly being coupled to a first support arm of the pair of support arms and a first wedge of the plurality of wedges, and the second linear bearing assembly being coupled to the second support arm and a second wedge of the plurality of wedges, and wherein the first and second linear bearing assemblies each comprise a linear bearing and a linear bearing slide rod that are configured to enable displacing the exhaust diffuser in the axial direction while vertically supporting the exhaust diffuser to maintain axial alignment between the exhaust diffuser and the gas turbine engine.

20. A diffuser removal tool for displacing an exhaust diffuser from a gas turbine engine, comprising:
- a pair of support arms;
- a clamp and wedge assembly configured to couple to an exhaust diffuser, wherein the clamp and wedge assembly comprises a plurality of wedges and a clamp, the clamp is configured to be circumferentially disposed about the exhaust diffuser, and the plurality of wedges are configured to be disposed between the clamp and the exhaust diffuser;
- a lead screw assembly coupled between the pair of support arms and to the clamp and wedge assembly via a first wedge of the plurality of wedges, wherein the lead screw assembly comprises a lead screw and a threaded nut coupled to the first wedge, and wherein the lead screw is configured to be rotated to adjust an axial position of the exhaust diffuser along a longitudinal axis of the gas turbine engine via axial displacement of the threaded nut along the lead screw; and
- a first linear bearing assembly coupled to a first support arm of the pair of support arms and to a second wedge of the plurality of wedges; and
- a second linear bearing assembly coupled to a second support arm of the pair of support arms and to a third wedge of the plurality of wedges, wherein the first and second linear bearing assemblies each comprises a linear bearing and a linear bearing slide rod that are configured to enable displacing the exhaust diffuser in the axial direction while vertically supporting the exhaust diffuser to maintain axial alignment between the exhaust diffuser and the gas turbine engine.

* * * * *